US009612912B2

(12) United States Patent
Wertheimer et al.

(10) Patent No.: US 9,612,912 B2
(45) Date of Patent: Apr. 4, 2017

(54) CENTRALIZED TAPE MANAGEMENT FOR DATABASES

(71) Applicant: Oracle International Corporation, Redwood Shores, CA (US)

(72) Inventors: Steven Wertheimer, Kentfield, CA (US); Raymond Guzman, Amherst, NH (US); Muthu Olagappan, Belmont, CA (US); William Fisher, Concord, MA (US); Vladimir Begun, Mountain View, CA (US); Sriram Nagaraja Rao, Belmont, CA (US); Beldalker Anand, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 14/202,433

(22) Filed: Mar. 10, 2014

(65) Prior Publication Data

US 2015/0254141 A1     Sep. 10, 2015

(51) Int. Cl.
*G06F 17/00* (2006.01)
*G06F 11/14* (2006.01)
*G06F 17/30* (2006.01)

(52) U.S. Cl.
CPC ...... *G06F 11/1451* (2013.01); *G06F 11/1461* (2013.01); *G06F 17/30312* (2013.01); *G06F 2201/80* (2013.01)

(58) Field of Classification Search
CPC ............. G06F 11/1448; G06F 11/1461; G06F 11/1458; G06F 11/1469; G06F 2201/84
See application file for complete search history.

(56) References Cited

U.S. PATENT DOCUMENTS 5,212,772 A * 5/1993 Masters ................ G06F 3/0601
   714/20
6,654,771 B1    11/2003 Parham et al.
(Continued)

OTHER PUBLICATIONS

ISR WO for PCT Application PCT/US2012/062622, dated Oct. 30, 2012, 11 pages.
(Continued)

*Primary Examiner* — Truong Vo
(74) *Attorney, Agent, or Firm* — Hickman Palermo Becker Bingham LLP

(57) ABSTRACT

A method, apparatus, and system for centralized tape management are provided for databases. A centralized availability machine or disk and tape backup server maintains working backup data for a plurality of database management systems (DBMSs) based on receiving, from each of the plurality of DBMSs, differential incremental updates. The updates may be at the database block level, with an index maintained to identify different versions of the blocks for snapshot recovery. The availability machine then determines a utilization schedule for distributing the working backup data to a plurality of tapes using a plurality of tape drives, and stores the working backup data as archived backup data on the plurality of tapes according to the utilization schedule. By placing each DBMS within a protection policy that indicates criteria to meet business goals with respect to tape backups, the utilization schedule can automatically schedule tape backup jobs with optimized hardware resource assignments.

48 Claims, 5 Drawing Sheets

(56) References Cited

U.S. PATENT DOCUMENTS

| | | |
|---|---|---|
| 6,785,786 B1 * | 8/2004 | Gold .................. G06F 11/1461 |
| | | 711/162 |
| 7,330,997 B1 | 2/2008 | Odom |
| 7,676,510 B1 | 3/2010 | Karinta |
| 8,112,661 B1 | 2/2012 | La France et al. |
| 2001/0034737 A1 | 10/2001 | Cane et al. |
| 2002/0069253 A1 | 6/2002 | Kazui et al. |
| 2004/0167898 A1 | 8/2004 | Margolus et al. |
| 2004/0260973 A1 | 12/2004 | Michelman |
| 2005/0038836 A1 | 2/2005 | Wang |
| 2005/0193236 A1 | 9/2005 | Stager et al. |
| 2006/0282630 A1 | 12/2006 | Hochberg et al. |
| 2007/0055833 A1 | 3/2007 | Vu et al. |
| 2007/0103984 A1 | 5/2007 | Kavuri et al. |
| 2007/0130232 A1 | 6/2007 | Therrien et al. |
| 2007/0136381 A1 | 6/2007 | Cannon et al. |
| 2007/0239949 A1 | 10/2007 | Childs et al. |
| 2008/0034004 A1 | 2/2008 | Cisler et al. |
| 2008/0281883 A1 | 11/2008 | Cannon et al. |
| 2008/0307175 A1 | 12/2008 | Hart et al. |
| 2009/0276588 A1 | 11/2009 | Murase |
| 2011/0093672 A1 | 4/2011 | Gokhale et al. |
| 2013/0024423 A1 | 1/2013 | Doshi et al. |
| 2013/0024426 A1 | 1/2013 | Flowers et al. |
| 2013/0110783 A1 | 5/2013 | Wertheimer et al. |
| 2013/0110969 A1 | 5/2013 | Wertheimer et al. |

OTHER PUBLICATIONS

Claims for PCT application PCT/US2012/062622, dated Oct. 30, 2012, 6 pages.

U.S. Appl. No. 13/286,070, filed Oct. 31, 2011, Advisory Action, Jan. 17, 2014.

U.S. Appl. No. 13/286,106, filed Oct. 31, 2011, Notice of Allowance, Nov. 21, 2014.

U.S. Appl. No. 13/286,106, filed Oct. 31, 2011, Notice of Allowance, Aug. 14, 2014.

U.S. Appl. No. 13/286,106, filed Oct. 31, 2011, Notice of Allowance, Jan. 9, 2015.

U.S. Appl. No. 13/286,070, filed Oct. 31, 2011, Office Action, Mar. 26, 2014.

U.S. Appl. No. 13/286,070, filed Oct. 31, 2011, Notice of Allowance, Sep. 10, 2014.

U.S. Appl. No. 13/286,070, filed on Oct. 31, 2013, Office Action, May 30, 2013.

\* cited by examiner

FIG. 1B

UTILIZATION SCHEDULE 136

DBMS 110A: Full backup every week, cumulative incremental every day
DBMS 110B: Full backup every month, differential incremental every 3 days
DBMS 110C: Full backup every month, differential incremental every 3 days

| | |
|---|---|
| April 1, 2013<br>0:00~12:00 | Full backup of DBMS 110A<br>Using 4 Tape drives: 152A-152D<br>Into Pool: Free_tapes, Cartridge #1, #2, #3, #4 |
| April 1, 2013<br>12:00~18:00 | Full backup of DBMS 110B<br>Using 2 Tape drives: 152A-152B<br>Into Pool: Free_tapes, Cartridge #5, #6 |
| April 1, 2013<br>18:00~24:00 | Full backup of DBMS 110C<br>Using 2 Tape drives: 152A-152B<br>Into Pool: Free_tapes, Cartridge #5, #6 |
| April 2, 2013<br>0:00~12:00 | Cumulative incremental backup of DBMS 110A<br>Using 1 Tape drive: 152A<br>Into Pool: Free_tapes, Cartridge #1, #2, #3, #4 |
| April 3, 2013<br>0:00~12:00 | Cumulative incremental backup of DBMS 110A<br>Using 1 Tape drive: 152A<br>Into Pool: Free_tapes, Cartridge #1, #2, #3, #4 |
| April 4, 2013<br>0:00~12:00 | Cumulative incremental backup of DBMS 110A<br>Using 1 Tape drive: 152A<br>Into Pool: Free_tapes, Cartridge #1, #2, #3, #4 |
| April 4, 2013<br>12:00~18:00 | Differential incremental backup of DBMS 110B<br>Using 1 Tape drive: 152A<br>Into Pool: Free_tapes, Cartridge #5, #6 |
| April 4, 2013<br>18:00~24:00 | Differential incremental backup of DBMS 110C<br>Using 1 Tape drive: 152A<br>Into Pool: Free_tapes, Cartridge #5, #6 |
| April 5, 2013<br>... | ... |

FIG. 1C

TAPE LIBRARY 150A
Time period: April 1, 2013, 0:00~12:00

| TAPE DRIVE 152A Writing Full Backup for DBMS 110A on Free_tapes, Tape #1 | TAPE DRIVE 152B Writing Full Backup for DBMS 110A on Free_tapes, Tape #2 | TAPE DRIVE 152C Writing Full Backup for DBMS 110A on Free_tapes, Tape #3 |
|---|---|---|
| TAPE DRIVE 152D Writing Full Backup for DBMS 110A on Free_tapes, Tape #4 | TAPE DRIVE 152E Available for Restore | TAPE DRIVE 152F Available for Restore |

TAPE LIBRARY 150B
Time period: April 1, 2013, 12:00~18:00

| TAPE DRIVE 152A Writing Full Backup for DBMS 110B on Free_tapes, Tape #5 Partition #1 | TAPE DRIVE 152B Writing Full Backup for DBMS 110B on Free_tapes, Tape #6 Partition #1 | TAPE DRIVE 152C Available |
|---|---|---|
| TAPE DRIVE 152D Available | TAPE DRIVE 152E Available for Restore | TAPE DRIVE 152F Available for Restore |

TAPE LIBRARY 150C
Time period: April 1, 2013, 18:00~24:00

| TAPE DRIVE 152A Writing Full Backup for DBMS 110C on Free_tapes, Tape #5 Partition #2 | TAPE DRIVE 152B Writing Full Backup for DBMS 110C on Free_tapes, Tape #6 Partition #2 | TAPE DRIVE 152C Available |
|---|---|---|
| TAPE DRIVE 152D Available | TAPE DRIVE 152E Available for Restore | TAPE DRIVE 152F Available for Restore |

FIG. 2

202
Maintain working backup data for a plurality of database management systems (DBMSs) based on receiving, from each of the plurality of DBMSs, differential incremental updates

204
Determine a utilization schedule for distributing the working backup data to a plurality of tapes using a plurality of tape drives

206
Store the working backup data as archived backup data on the plurality of tapes according to the utilization schedule

CENTRALIZED TAPE MANAGEMENT FOR DATABASES

FIELD OF THE INVENTION

The present disclosure relates to databases, and more specifically, to centralized tape management for databases.

BACKGROUND

To meet business objectives for database availability and to comply with legal and regulatory requirements for data retention, it is becoming increasingly important to maintain a highly reliable backup and recovery infrastructure. Additionally, for scalability in modern enterprise environments where large data sets from multiple databases must be serviced concurrently, it is also crucial to minimize performance overhead and to optimize hardware resource utilization.

For cost effectiveness, it is prudent to implement a multi-tiered storage strategy where data is archived on a lower cost storage tier, such as magnetic tape. In this manner, the total cost for storage media may be reduced while meeting data retention requirements. On the other hand, supporting archival storage tiers will incur additional costs in the form of hardware infrastructure. In the case of magnetic tape, a significant investment in tape libraries is required, which may include tape drives, tape cartridge slots, and robotic loaders. Since it may not be cost effective to provide individual tape libraries for each database, a typical configuration may provide shared access to a tape library over a network.

As tape management software is generally installed separately on each database for a shared tape library configuration, administration is fragmented and backup coordination between multiple databases is difficult or impossible. Accordingly, database administrators must carefully and manually plan, manage, and maintain tape backup schedules for each individual database to avoid contention at the tape library. To avoid performance impacts and downtime at production database systems, it is desirable to complete the tape backup operations as quickly as possible during the most idle database time periods when processing and I/O resources are available. However, since this idle time period is typically around the same time for all the databases, the tape library must be over-provisioned to avoid contention and to complete backups within their scheduled backup time windows.

Accordingly, the hardware utilization of the shared tape library is suboptimal, as the tape library may be idle for a majority of time outside of the scheduled backup time windows. Furthermore, since the tape backup utilization schedules are manually set for each database, coordination between the databases is non-existent or left to the manual adjustment of a database administrator, who may be unable to accurately weigh the competing backup workload demands required from each database. Since the tape management software is often a general purpose software that operates at the file system level, actual changes to the database may only be captured at the file or file allocation unit level, leading to extraneous backups of unchanged data and suboptimal database restore procedures with lengthy mean times to recovery. Adding support for new databases and evolving patterns of data access may also require corresponding changes to the tape backup schedules, presenting a heavy and continuous administrative burden.

Based on the foregoing, there is a need for a method to provide a highly optimized and cost efficient tape backup infrastructure suited to the needs of databases while imposing minimal administrative burdens and production database performance overheads.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that depicts an example utilization schedule created by centralized tape management for databases, according to an embodiment;

FIG. 1C is a block diagram that depicts a utilization of a tape library according to the example utilization schedule, according to an embodiment;

FIG. 2 is a flow diagram that depicts a process for providing centralized tape management for databases, according to an embodiment;

DETAILED DESCRIPTION

Figure 1A:
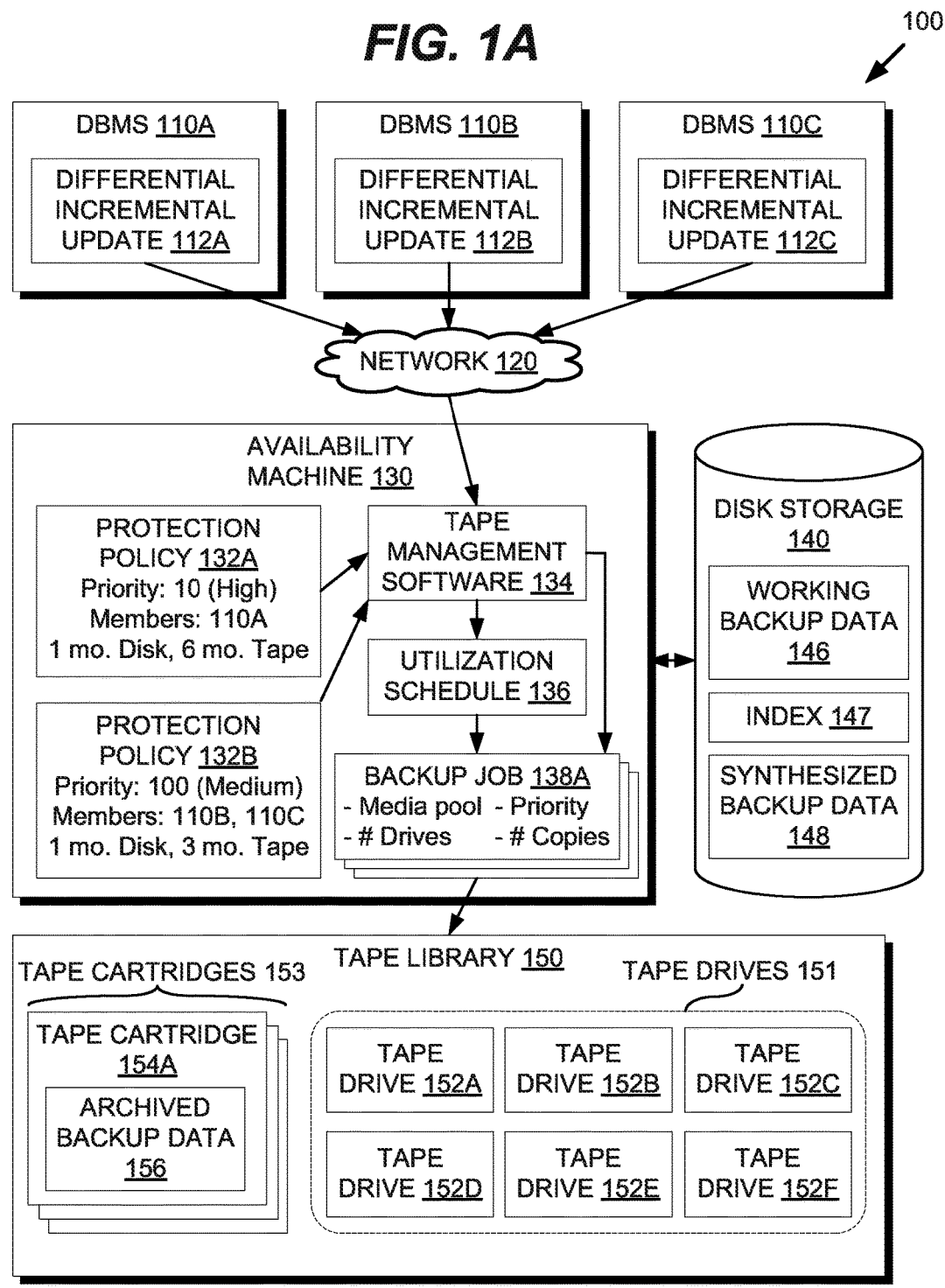
FIG. 1A is a block diagram that depicts an example system of centralized tape management for databases, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, centralized tape management is provided for databases. Each database may provide periodic batches or a continuous stream of differential incremental updates, which are received by a centralized availability machine, or a disk and tape backup server. In some embodiments, the availability machine may be executed on demand and may retrieve updates that are deposited into a remote storage location, such as a cloud service storage host. The availability machine can access the updates at the database block level, which includes database block metadata such as file numbers and watermarks, allowing the updates to be efficiently indexed and maintained on disk storage as working backup data.

Based on the backup workloads and the relative priority levels of each database, which may be specified using protection policies, the availability machine may automatically generate a utilization schedule to write the working backup data as archived backup data using a tape library. To optimize the usage of the tape library when assigning hardware resources to backup jobs, multiple tape drives may be assigned to provide sufficient parallel bandwidth scaling for the size of each backup workload. Additionally, backup sets may be arranged onto tape cartridges according to proximity, for example by colocating data to avoid tape seeking and tape changing latencies. The archived backup data may be written using any desired combination of full, differential incremental, and cumulative incremental backups, which can be synthesized in-advance or on demand from the indexed working backup data. If finer control is desired, the administrator may also specify manual hardware resource and media allocations within a protection policy or for a particular database to override or guide the automated utilization schedule.

Accordingly, the availability machine can balance tape library usage for optimal and continuous operation, avoiding idle database time period contention and the need for overprovisioning, as with shared tape libraries. By working at the database block level with access to database metadata rather than at the higher filesystem level, the changes to the databases can be tracked, indexed, and maintained as working backup data in an optimal fashion, minimizing network, processing, and storage overhead. Additionally, much of the previously manual configuration and administration of the tape library can now be automated by the centralized availability machine, which is in the best position to assign and schedule tape library resources to synthesize the working backup data into appropriate archived backup data sets. As a result, a highly optimized and cost efficient tape backup infrastructure can be provided for databases while imposing minimal administrative burdens and production database overhead.

Database Systems

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

DEFINITIONS

A "differential incremental update" as used in this application refers to data that describes the changes to update a state of a database from a prior consistent state to a subsequent consistent state. The "prior consistent state" can correspond to any database state, in contrast to a "cumulative incremental update", wherein the prior consistent state must correspond to a database state represented by a last full backup set. A differential incremental update may comprise one or more changes, which are represented in data by copies of changed database blocks, or copies of database block versions, and possibly an archive log of redo or change records. Each change may be identified by metadata indicating a date and time or timestamp when each change is committed, which may also include a logical timestamp, a non-limiting example of which is a System Commit Number (SCN).

"Working backup data" as used in this application refers to all received versions of database blocks for each data file associated with the databases of each DBMS to be protected by the availability machine. As described in the patent "Virtual Full Backups", U.S. patent application Ser. No. 13/286,106 filed Oct. 31, 2011, which is hereby incorporated by reference in its entirety for all purposes as if fully set forth herein, a block pool may be maintained for each data file of each database, wherein the block pool contains a full copy of each initial block version for the data file to be backed up, as well as all subsequent updated block versions from differential incremental backups of the database associated with the data file. The "working backup data" of this application may thus refer to the collection of block pools for each data file of each database of each DBMS to be protected by the availability machine. Further, an index may be maintained to distinguish the different versions of the database blocks within the block pools, for example by associating each database block with a watermark, wherein the watermark may correspond to a logical time such as a SCN.

System Overview

FIG. 1A is a block diagram that depicts an example system of centralized tape management for databases, according to an embodiment. System 100 of FIG. 1A includes database management system (DBMS) 110A, DBMS 110B, DBMS 110C, network 120, availability machine 130, disk storage 140, and tape library 150. DBMS 110A includes differential incremental update 112A. DBMS 110B includes differential incremental update 112B. DBMS 110C includes differential incremental update 112C. Availability machine 130 includes protection policy 132A, protection policy 132B, tape management software 134, utilization schedule 136, and backup job 138A. Disk storage 140 includes working backup data 146 and index 147, and synthesized backup data 148. Tape library 150 includes tape cartridges 153 and tape drives 151. Tape cartridges 153 include tape cartridge 154A, which includes archived backup data 156. Tape drives 151 include tape drive 152A, tape drive 152B, tape drive 152C, tape drive 152D, tape drive 152E, and tape drive 152F.

It should be noted that FIG. 1A only shows one specific embodiment with three DBMSs, a single network, a single disk storage, a single availability machine with no replication servers, and a single tape library. In other embodiments, any number of DBMSs, networks, disk stores, availability machines, replication servers, and tape libraries may be supported. Further, each tape library may have any number of tape cartridges, tape cartridge slots, tape drives, and other supporting hardware, such as robotic changing mechanisms, which are not specifically shown in FIG. 1A.

In FIG. 1A, each DBMS 110A-110C may be required to maintain backups of their respective databases for various legal and business reasons. Due to the high volume of data used by modern enterprises and the long retention times demanded by today's regulatory environment, the use of low-cost archival media such as magnetic tape may be preferred to keep storage budgets within a reasonable range.

Prior to the introduction of availability machine 130, each DBMS 110A-110C may maintain backups by executing a separate copy of tape management software 134 with shared access to tape library 150 over network 120. Database administrators must therefore manually configure backup schedules for tape management software 134 on each DBMS 110A-110C to avoid contention with other databases. Further, since waiting due to tape latencies may negatively impact production workloads, the backup schedules also need to be configured during periods of low database activity. Since these periods of low database activity may typically overlap between the DBMSs, backup scheduling may be restricted to a relatively limited time window. Thus, network 120 and tape library 150 must be overprovisioned to handle all of the scheduled backups during this limited time window, increasing network infrastructure and tape library costs. Administrative costs are also increased, as database administrators must continually monitor backup performance and modify backup configurations to compensate for evolving data creation patterns and/or the introduction of new DBMSs into system 100.

Accordingly, to improve the utilization of tape library 150 and reduce infrastructure and administration costs, a centralized availability machine 130 is proposed that automates the process of scheduling backups for DBMS 110A-110C while efficiently using the available resources of tape library 150. Tape management software 134 retrieves differential incremental updates 112A-112C over network 120 on a periodic or continuous basis, indexing the update data onto disk storage 140 as working backup data 146 and index 147. By using a local or remote management terminal for availability machine 130, each DBMS may be associated with a particular protection policy, such as protection policy 132A-132B. Each protection policy may define a relative priority for automatic resource assignment, which may be reflected using a priority level value or backup retention window sizes. Alternatively, protection policies may explicitly specify a periodic schedule of backups, without specifying the exact start times.

Based on the protection policies and the resource availability of tape library 150, tape management software 134 may generate utilization schedule 136, which defines a distribution of working backup data 146 as archived backup data 156 using tape drives 151 at scheduled times. Utilization schedule 136 may be configured to favor a continuous, load-balanced usage of tape drives 151 to minimize resource contention, optimize hardware utilization, and keep tape drives available for restore jobs or new backup jobs. Based on utilization schedule 136, tape management software 134 may create synthesized backup data 148 from working backup data 146 and index 147. Synthesized backup data 148 contains the scheduled backup sets for writing as archived backup data 156. In some embodiments, synthesized backup data 148 may not be kept on disk storage 140 and may instead be generated on-demand.

Database Backup by Centralized Tape Management Process

With a basic outline of system 100 now in place, it may be instructive to review a high level overview of the processing steps to backup databases by centralized tape management. Turning to FIG. 2, FIG. 2 is a flow diagram that depicts a process 200 for providing centralized tape management for databases, according to an embodiment.

Protection Policy Overview

Prior to the start of process 200, an administrator should first create one or more protection policies. Each protection policy comprises metadata that specifies one or more criteria with respect to tape backup procedures. These protection policies may be generated in response to user policy input, which may indicate one or more business goals or factors that are translated into the protection policies. In FIG. 1A, these business goals are reflected by specifying a priority level relative to other protection policies. For example, in FIG. 1A, each protection policy is associated with a priority value, with smaller numbers indicating higher priority. Thus, protection policy 132A specifies priority level 10, or high priority, whereas protection policy 132B specifies priority level 100, or medium priority. These priorities are then used as a basis to assign resources from tape library 150 to specific backup job schedules, as described further below under the heading "DETERMINING A UTILIZATION SCHEDULE". For example, in one embodiment, a higher priority for a DBMS will prioritize a faster recovery process for that DBMS, or a faster mean time to recovery (MTTR). In other embodiments, a higher priority for a DBMS will prioritize a faster completion of backups to tape, or preferential access to tape drive resources.

In other embodiments, different criteria can be used to reflect the business goals, such as backup retention window sizes for both disk and tape. For example, as shown in FIG. 1A, protection policy 132A may specify a preferred disk backup retention window of one month and a preferred tape backup retention window of six months, where each DBMS under protection policy 132A can be restored from disk at any point in time from one month ago until the current time, and from tape at any point in time from six months ago until the current time. Similarly, as shown in FIG. 1A, protection policy 132B may specify a preferred one month disk backup retention window, and a preferred three month tape backup retention window. These windows may be specified as preferred goals that are satisfied on a best attempt basis and/or as hard minimums.

If window sizes are omitted from the user policy input, then availability machine 130 may provide a default window size. In some embodiments, this default window size may be unlimited, allowing backups to write to tape until free tape cartridges are exhausted. If deletion of older sets is permissible, then availability machine 130 may delete the oldest backup sets to make free space for new backup sets when media space is exhausted.

Note that by specifying only window sizes in user policy input, the specific schedules to fill the backup retention windows are not specified by the user. Accordingly, the scheduling and composition of the backups is automatically determined by availability machine 130. However, in other embodiments, the automatic backup scheduling and composition can be overridden by manually scheduling periodic backups for each database into specific media pools. This option may be preferred if the database administrator seeks to have more detailed control over the specific composition of the backups to be stored on tape. For example, DBMS 110A may be configured to write a full backup on a weekly basis with cumulative incremental backups written on a daily basis in between, whereas DBMS 110B and 110C may be configured to write a full backup on a monthly basis with differential incremental backups written every three days in between.

Regardless of the particular way that the business goals are specified in the user policy input, it should be noted that the user is freed from the burden of explicitly scheduling the exact times that the backups should occur. Accordingly, the database administrator no longer needs to manually coordinate the backups between the different DBMSs to avoid contention, as this task is now delegated to availability machine 130, which is in the best position to observe the relative backup workloads of each DBMS and the available tape resources from tape library 150. Moreover, because tape library 150 is no longer directly accessed from each DBMS, tape latency impact concerns on production databases are minimized, and tape library 150 can be efficiently utilized even during periods of heavy database activity.

The protection policies may be created by using a local or remote administration terminal of availability machine 130. For example, a DBMS may be installed on availability machine 130, and a user may login locally or remotely to configure and manage availability machine 130 through PL/SQL packages or other interfaces exposed by the DBMS. Accordingly, the administrator may input one or more user policies using a PL/SQL package, which are then translated and stored as metadata, or protection policies 132A-132B in FIG. 1A. Note that in some cases, the user policies may only specify high level business goals, which are then translated to more detailed criteria within the protection policies. Thus, the protection policies do not necessarily correspond to the same data as the user policy input. Once the protection policies are created, then each DBMS may then be associated with one of the protection policies. As shown in FIG. 1A, DBMS 110A is assigned to protection policy 132A, whereas DBMS 110B and DBMS 110C are assigned to protection policy 132B.

Availability Machine API

To discuss the creation of the protection policies in greater detail, an example application program interface (API) is illustrated below in the form of a PL/SQL package with various functions and procedures. Prior to process 200, an administrator may use the API to setup a working backup environment for availability machine 130. First, the administrator should indicate all available storage resources, including disks and tape. Second, the administrator should define a number of protection policies or classes of backup protection. Third, the administrator should define the databases or DBMSs to be protected by associating each DBMS with one of the defined protection policies. After these steps are completed, then the backup job scheduling can be left for availability machine 130 to determine automatically, or alternatively the administrator may manually schedule the desired backup job schedules for each protection policy.

Note that a PL/SQL package is only one example API; any number of different interfaces can be defined to manage availability machine 130, including various stand-alone or front-end command-line interfaces (CLI), libraries, or graphical user interfaces (GUI). For example, a web based GUI may be provided to allow the administrator to perform the same tasks as described below. Further, while a PL/SQL package relies on a DBMS to define and maintain configuration metadata, alternative embodiments may use other data structures for metadata, including data structures that do not utilize databases.

Defining Storage Locations

First, to define the available disk resources for hosting working and synthesized backups, the administrator may invoke a "create_storage_location" PL/SQL procedure to setup disk storage 140 as a working storage area for use by availability machine 130, including specifying an allocation unit size and an allocation of available space. For example, to define disk storage 140 with the name "Main storage" having 64 KB allocation units and reserved space of 300 TB allocated, the administrator may issue the following command, wherein "storage_140" refers to disk storage 140 as an Oracle ASM disk group:

create_storage_location("Main_storage", "storage_140", "64 KB", "300 TB");

The API may also include additional PL/SQL procedures to rename, expand, and delete the defined storage locations.

While disk storage 140 is shown as a locally accessible Oracle ASM disk group in FIG. 1A, the "create_storage_location" PL/SQL procedure may also setup other types of local and remote storage locations via various network technologies and storage protocols including TCP/IP, Fibre Channel, InfiniBand, SMB/CIFS, NFS, iSCSI, Oracle Automatic Storage Management (ASM), cloud service storage APIs such as Amazon Simple Storage Service (S3), and others. Multiple storage locations may be specified by repeating the "create_storage_location" PL/SQL procedure, but for simplicity only disk storage 140 will be used as a storage location in FIG. 1A.

Defining Tape Resources

To define the available tape resources, the administrator may invoke a "create_sbt_library" PL/SQL procedure to setup tape management software 134 as a tape library interface for use by availability machine 130, wherein tape management software 134 is configured to utilize tape library 150. To define tape management software 134 with the name "Main tape library" with a maximum permissible load of 6 tape drives with 2 tape drives reserved for restore operations, the administrator may issue the following command, wherein "lib134.so" refers to tape management software 134:

create_sbt_library("Main_tape_library", 6, 2, "SBT_LIBRARY=/usr/local/oracle/backup/lib/lib134.so");

The API may also include additional PL/SQL procedures to modify and delete the defined SBT or tape library interfaces.

To define the available tape media, the administrator may invoke one or more "create_sbt_media_pool" PL/SQL procedures to reference particular pools of media from tape cartridges 153. For example, assuming that a "poolid" of 153 corresponds to all free tapes within tape cartridges 153, the administrator may issue the following command to add a "Free_tapes" media pool to the main tape library:

create_sbt_media_pool("Main_tape_library", "Free_tapes", poolid=153);

The API may also include additional PL/SQL procedures to modify and delete the defined SBT or tape media pools. If the administrator wishes to dedicate tape drives for a particular DBMS or protection policy, then dedicated tape library interfaces and associated media pools may also be created using the above commands.

Creating Protection Policies

Next, after the storage locations and tape resources are defined, protection policies can be created and associated with the defined storage locations and tape resources. Thus, the administrator may invoke a "create_protection_policy" PL/SQL procedure to provide user policy input for creating a protection policy, which is also associated with a particular storage location. The API may include additional PL/SQL procedures to modify and delete the defined protection policies.

The protection policies may be defined by various criteria, depending on the level of detail the administrator wishes to specify in the user policy input. At a high level, the administrator may only specify relative priority level values, leaving availability machine 130 with the discretion on how to organize, schedule, and retain the backups on tape. If specific retention periods are desired, then the administrator may specify desired backup retention window sizes. If more detailed control over the organizing and scheduling of the backups on tape is desired, then the administrator can specify explicit periodic backup schedules. In different embodiments, these factors or various other factors can be specified to define backup business goals in the user policy input, which are then translated into criteria for each of the protection policies.

If the administrator wants to use relative priority levels to setup availability machine 130 in accordance with FIG. 1A, the administrator may issue the following commands:

create_protection_policy("policy_132A", "Main storage", priority_class="High");
    create_protection_policy("policy_132B", "Main storage", priority_class="Medium");

where the "priority_class" argument specifies a priority for all members of the protection policy, relative to other protection policies. As shown in FIG. 1A, "High" is translated to priority level 10, whereas "Medium" is translated to priority level 100.

If the administrator wants to specify retention periods for each protection policy class, then the following commands may be issued:

create_protection_policy("policy_132A", "Main storage", recovery_window_goal="INTERVAL '1' MONTH", recovery_window_sbt="INTERVAL '6' MONTH");
    create_protection_policy("policy_132B", "Main storage", recovery_window_goal="INTERVAL '1' MONTH", recovery_window_sbt="INTERVAL '3' MONTH");

where the "recovery_window_goal" argument specifies the desired time window of backups that should be accessible from disk, and where the "recovery_window_sbt" argument specifies the desired time window of backups that should be accessible from the combination of disk and tape. The backup retention windows allow availability machine 130 to automatically purge old backup data from disk and tape, allowing the reclaiming and recycling of disk and tape storage. Since the windows are specified here as goals rather than hard minimums, availability machine 130 will meet these windows on a best attempt basis. In alternative embodiments, arguments may be provided to specify a minimum guaranteed time window in addition to or in place of the time window goals. The backup time windows may also serve to provide an implicit priority class in lieu of the explicit priority classes defined above, as a longer backup retention window may infer a higher priority.

After issuing the above commands, availability machine 130 will attempt to keep at least a 1 month window of disk backups and a 6 month window of tape backups for databases covered under protection policy 132A, and at least a 1 month window of disk backups and a 3 month window of tape backups for databases covered under protection policy 132B. Once a backup set expires from the disk backup retention window, it may be migrated to tape and purged from disk. After the backup set expires from the tape backup retention window, it may be purged from tape, and free tapes may be recycled back into the media pool. Note that each backup retention window allows for a restore at any requested point in time within the backup retention window by restoring an appropriate backup set, which may include a combination of full and differential incremental or cumulative incremental backup sets, and by applying all necessary change or redo records to bring the database to a consistent state for the requested point in time.

Manual Tape Backup Scheduling

By default, availability machine 130 may use the defined protection policies to automatically create appropriate tape backup schedules for each database using any free media pool. However, if the administrator wants to specify explicit backup schedules or specific media pools for a specific database, then the administrator may specify an override such as "autoschedule=false" when adding a database to a protection policy, and instead issue one or more "create_sbt_job" PL/SQL procedures to define backup jobs for a database. These backup jobs may then be queued by issuing a "queue_sbt_backup_task("backup_job")" PL/SQL procedure at desired time intervals using a scheduler, which may be an external program, a service of tape management software 134, or a service provided by a DBMS of availability machine 130.

For example, to schedule weekly full backups with daily cumulative incremental backups for DBMS 110A, the administrator may issue the following commands:
    create_sbt_job("Full_backup_110A", "DBMS_110A", "Free_tapes", "FULL", 1);
    create_sbt_job("CDiff_backup_110A", "DBMS_110A", "Free_tapes", "CDIFF", 1);
    schedule("queue_sbt_backup_task ("Full_backup_110A")", "INTERVAL '1' WEEK");
    schedule("queue_sbt_backup_task ("CDiff_backup_110A")", "INTERVAL '1' DAY");

The scheduler may automatically subsume differential incremental or cumulative incremental backups into an overlapping full backup. For example, in the above defined backup schedule of DBMS 110A, each week may generate 1 full tape backup and 6 cumulative incremental tape backups, as the $7^{th}$ cumulative incremental tape backup will be subsumed into the full backup. The priority of each queued backup job may be automatically inherited from the associated protection policy, or may be otherwise manually overridden with a set priority level.

To schedule monthly full backups with differential incremental backups every three days for DBMS 110B and 110C, the administrator may issue the following commands:
    create_sbt_job("Full_backup_110B", "DBMS_110B", "Tapeset_B", "FULL", 1);
    create_sbt_job("Incr_backup_110B", "DBMS_110B", "Tapeset_B", "INCR", 1);
    schedule("queue_sbt_backup_task("Full_backup_110B")", "INTERVAL '1' MONTH");
    schedule("queue_sbt_backup_task("Incr_backup_110B")", "INTERVAL '3' DAY");
    create_sbt_job("Full_backup_110C", "DBMS_110C", "Tapeset_C", "FULL", 1);
    create_sbt_job("Incr_backup_110C", "DBMS_110C", "Tapeset_C", "INCR", 1);
    schedule("queue_sbt_backup_task("Full_backup_110C")", "INTERVAL '1' MONTH");
    schedule("queue_sbt_backup_task("Incr_backup_110C")", "INTERVAL '3' DAY");

Note that in the above example, each DBMS 110B-110C is assigned to specific reserved media pools: "Tapeset_B" for DBMS 110B and "Tapeset_C" for DBMC 110C. "Tapeset_B" and "Tapeset_C" may refer to distinct sets of tapes within tape cartridges 153, outside of the defined "Free_tapes" media pool. These dedicated media pool assignments may help to accommodate the physical transport of backups from one location to another, as the administrator can simply remove the tape cartridges of a particular media pool without disrupting access to other backups.

While the above examples assume that only a single backup copy is reserved for each database, alternative embodiments may schedule multiple duplicate copies onto the same or different media pools. In this manner, additional redundancy can be provided, and separate portable media pools can also be provided for easy physical transport of backups. Disk storage 140 may also be configured to provide redundancy through disk mirroring, RAID, parity data, and other techniques.

Additional layers of redundancy and failover may also be provided by adding downstream replication servers for availability machine 130. The replication servers may be configured in a manner similar to availability machine 130, and may receive differential incremental updates 112A-112C forwarded from availability machine 130 using the same availability machine API calls for actively sending backups. Note that the protection policies and other metadata need not be the same between availability machine 130 and the replication servers, enabling different configurations for various use cases.

Adding Protected Databases

Next, once the protection policies are defined, each DBMS can be protected under a particular protection policy. Thus, the administrator may invoke an "add_db" PL/SQL procedure to enroll a specific DBMS under a particular protection policy. For example, to setup availability machine 130 in accordance with FIG. 1A, the administrator may issue the following commands:
    add_db("dbms_110A", "policy_132A");
    add_db("dbms_110B", "policy_132B");
    add_db("dbms_110C", "policy_132B");

As discussed above, the adding of a DBMS to a particular protection policy may automatically generate a backup schedule for that DBMS, unless overridden otherwise.

Availability Machine Service

To begin accepting updates from the DBMSs to be protected, an availability machine service should be started. To startup the availability machine service, including tape management software 134, a PL/SQL procedure "startup_availability_machine" may be manually invoked. Alternatively, the "startup_availability_machine" procedure may be automatically invoked by a database trigger when a DBMS is restarted on availability machine 130. Once the service is started, block 202 may proceed, as discussed below under "MAINTAINING WORKING BACKUP DATA". Other PL/SQL procedures may also be defined to shutdown and halt the availability machine service.

For large enterprises with high volumes of data to be backed up, a local availability machine 130 may be the most cost effective approach, with the service running at all times. For less demanding workloads, availability machine 130 may be hosted on a remote provider, and the service may also be started and shutdown on-demand. If the service is to be invoked on-demand, it may be preferable to define polling policies, as described below, so that each DBMS can deposit updates regardless of the running status of the service.

Automated Configuration

In the above examples the administrator manually configures the protection policies, available tape resources, and databases to be protected. However, in other embodiments, some or all of this configuration process may be automated. For example, a configuration utility may be provided that scans for all network accessible databases, all available tape resources, and all available storage locations, and then generates a configuration script to automatically configure availability machine 130 by issuing commands similar to those described in the API described above. Optionally, the configuration script may also be automatically executed after creation. The configuration script may employ data analysis of database statistics and historical data from DBMS 110A-110C to estimate the relative backup workload data sizes for each database, allowing the creation of protection policies with proportional priority levels and the creation of backup schedules tailored to the demands of each DBMS.

Maintaining Working Backup Data

With all the metadata entered by the API into tape management software 134 and the service for availability machine 130 up and running, process 200 may now proceed. At block 202 of process 200, referring to FIG. 1A, tape management software 134 maintains working backup data 146 for DBMSs 110A-110C based on receiving, from each DBMS 110A-110C, differential incremental updates 112A-112C. In the example shown in FIG. 1A, the differential incremental updates 112A-112C are actively and directly sent by each DBMS 110A-110C over network 120 to availability machine 130, based on schedules specified at each DBMS 110A-110C. For example, each DBMS may send updates on a daily basis using an API of tape management software 134. In other embodiments, differential incremental updates 112A-112C may be streamed to availability machine 130 in real-time or near real-time as each DBMS executes its workload, similar to a process of streaming change or redo records to a standby or replication database.

In yet other embodiments, DBMSs may instead passively deposit differential incremental updates 112A-112C to an agreed location. In this case, a "create_polling_policy" PL/SQL procedure may be invoked to create a polling policy for a particular DBMS. The API may also include additional PL/SQL procedures to modify and delete the defined polling policies. The polling policy may specify a specific location to poll for new backup data from the DBMS, a frequency of polling, and whether to delete newly discovered data after polling and processing.

To minimize backup overhead on production DBMSs, each of differential incremental updates 112A-112C only contains those changes that occurred since the last update. This is in contrast to cumulative incremental updates, where each update cumulatively includes all changes from the last full backup. To reduce traffic load over network 120, each of the differential incremental updates 112A-112C may also be compressed for transmission. Additionally, in some embodiments, the incremental updates may be encrypted or otherwise secured. The changes may include copies of each updated database block in each updated data file, which may include multiple versions of the same database block, and may include metadata indicating a commit time or timestamp for each change. To include changes that have been committed but not yet written to disk, an archive log of change or redo records may also be included within each update. In some embodiments, the metadata for each change may include a watermark, such as a block version number, a System Commit Number (SCN), or another logical time value that indicates a consistent state of the DBMS after the change is committed.

When the watermark is an increasing value, then a change with a higher watermark can be determined to be more recent than a change with a lower watermark. In this manner, DBMSs 110A-110C and availability machine 130 can readily determine between different block versions without using computationally intensive methods such as hashing. To expedite a determination whether a database block has been updated since a prior update, a checkpoint watermark may be maintained for each DBMS 110A-110C at availability machine 130 that corresponds to the highest value watermark from the last sent or applied update for the respective DBMS. When a DBMS determines that reconciliation is required, for example according to the schedules as described above, then the DBMS can compare a current watermark with the checkpoint watermark from availability machine 130 to determine which database blocks have been updated, which can then be sent as a batch incremental differential update to availability machine 130.

Regardless of the specific method of retrieving differential incremental updates 112A-112C from DBMSs 110A-110C, tape management software 134 may then proceed to store and index the updates as working backup data 146 and index 147 on disk storage 140. As described in the patent "Virtual Full Backups", U.S. patent application Ser. No. 13/286,106 filed Oct. 31, 2011, differential incremental updates received from multiple DBMSs can be written to storage, such as disk storage 140. If an archive log of change or redo records is provided within the differential incremental updates, then the log can be merged into corresponding updated database block versions. Each changed version of the database blocks can then be stored in working backup data 146, and an index 147 can be generated that associates the received metadata with the matching database block within working backup data 146. Thus, index 147 identifies the various different versions available for each database block in working backup data 146. However, since disk storage 140 is a finite and relatively high-cost storage tier, working backup data 146 should only be used to store the most recent changes. The exact time period of "most recent" may be specified by a disk backup retention window. Thus, older database sets and their associated database blocks can be eventually archived into tape library 150 and purged from synthesized backup data 148 and working backup data 146 respectively to reclaim disk space. In some embodiments, low disk space may be used instead of a disk backup retention window to trigger archival of older database sets.

Determining a Utilization Schedule

Accordingly, at block 204 of process 200, referring to FIG. 1A, tape management software 134 determines a utilization schedule 136 for distributing the working backup data 146 to tape cartridges 153 using tape drives 151. More specifically, by using the prior API-defined metadata including protection policies 132A-132B and the knowledge of resources available from tape library 150, tape management software 134 can generate a utilization schedule 136 that concretely assigns backup tasks to distribute portions of working backup data 146 to particular tape resources of tape library 150 at specific times.

Turning to FIG. 1B, FIG. 1B is a block diagram that depicts an example utilization schedule created by centralized tape management for databases, according to an embodiment. Utilization schedule 136 of FIG. 1B may correspond to utilization schedule 136 of FIG. 1A. As shown in FIG. 1B, utilization schedule 136 includes a summarized periodic schedule for each DBMS as well as a more detailed schedule that specifies start times for specific backup jobs.

As discussed above, the administrator may specify the exact scheduling details as broadly or specifically as desired. In the broad case where the administrator only specifies relative priority levels for protection policies, availability machine 130 may generate schedules based on estimated backup data sizes from each DBMS. Utilization of tape library 150 may be dictated by the relative priority levels: a higher priority may indicate a desire for a faster restore time and/or a faster backup to tape, in which case a higher level of tape driver parallelism is desirable. With these factors known and the performance of tape drives 151 known or otherwise benchmarked, availability machine 130 can generate a summarized periodic schedule for each DBMS, as shown in utilization schedule 136 of FIG. 1B. The periodic schedule may then be used as a basis for a more detailed time schedule, as also shown in FIG. 1B.

Periodic Schedules

As shown in utilization schedule 136, DBMS 110A is scheduled for weekly full backups with daily cumulative incremental backups. Since DBMS 110A is under protection policy 132A, which inherits a level 10 or high priority level, it may be desirable to expedite the restore process for DBMS 110A as much as possible while taking into consideration the estimated volume of data to backup from working backup data 146 and the available tape resources in tape library 150. To this end, the backup schedule for DBMS 110A may be set fairly aggressively, with a weekly full backup and daily cumulative incremental backups. In this manner, a worst case restore will only need to read one full backup set and one cumulative incremental backup set. Further, a large measure of redundancy is provided by the frequent full backups.

On the other hand, DBMS 110B and DBMS 110C are scheduled for monthly full backups with differential incremental backups every 3 days. Since DBMS 110B and 110C are under protection policy 132B, which inherits a level 100 or medium priority level, the backup schedules may be set less aggressively. While a worst case restore will need to read one full backup set and 9 differential incremental backup sets, the differential incremental backup strategy helps to preserve tape media resources. If a specific type of incremental backup is preferred, an override for cumulative or differential may be specified when defining the protection policies.

If backup retention windows are specified for protection policies 132A and 132B instead of priority levels, then the backup retention window sizes may be used as proxy indicators for the priority levels, with larger sized backup retention windows indicating a higher priority. Otherwise, if backup retention windows are provided in addition to priority levels, then the backup retention windows may merely indicate to availability machine 130 when to begin deleting older backup sets for space reclamation and tape media recycling.

Of course, as described above, the administrator may also override these automatic schedules by manually specifying periodic schedules of full backups, cumulative incremental backups, and differential incremental backups. Even though the administrator manually specifies the periodic schedules in this instance, the administrator is nevertheless freed from specifying the exact times when the backup jobs should occur, which is specified in the detailed timeline schedule as described below. Accordingly, availability machine 130 can help to simplify backup administration even when the composition of the backups is manually set.

Detailed Timeline Schedule

With the above periodic schedules as general guidelines, availability machine 130 can now develop a detailed timeline schedule for distributing the working backup data 146 to tape cartridges 153 using tape drives 151. Recall that the "Main_tape_library" interface specified a maximum load of 6 tape drives at tape library 150, with at least 2 tape drives reserved for restore operations. Accordingly, a maximum of 4 tape drives are available for backup operations. In the example shown in FIG. 1B, all DBMSs share a common set of tape drives exposed by the "Main_tape_library" interface. In other embodiments, multiple tape interfaces may be defined to reserve tape drives for specific protection policies or DBMSs.

Since DBMS 110A is associated with a higher priority level 10, it may be scheduled for backups before other DBMSs with lower priority levels. Accordingly, as shown in FIG. 1B, a full backup of DBMS 110A is scheduled to start on Apr. 1, 2013 at 0:00, with an estimated backup time of 12 hours. The backup time may also include one or more verify passes, which may be specified for each DBMS, for each protection policy, or for each tape library interface. Alternatively, the verification passes may be separately scheduled at a later time. Assuming that all of tape drives 151 are free and available, the full backup can be written in a striped fashion using the maximum 4 tape drives, tape drives 152A-152D, onto tape cartridges #1, #2, #3, and #4 in the "Free_tapes" media pool. In this manner, the backup and any future restores can proceed using the bandwidth of 4 tape drives, rather than a single tape drive. This is illustrated in tape library 150A of FIG. 1C, where like numbered elements may correspond to the same elements from FIG. 1A.

Next, DBMS 110B is scheduled for a full backup to start on Apr. 1, 2013 at 12:00, with an estimated backup time of 6 hours. Since DBMS 110B is associated with a medium priority level 100, only 2 tape drives, or tape drives 152A-152B are utilized. This is illustrated in tape library 150B of FIG. 1C. Further, while the tape cartridges are still selected from the same "Free_tapes" media pool, a different set of tapes, or tape cartridges #5 and #6, is selected for writing. In some cases, the same set of tapes may also be selected, as discussed below.

Colocating Related Backup Sets

To minimize the latency effects of tape seek and change operations during restore operations, it is preferable to colocate the archived backup data by proximity for each of the DBMSs when writing to tape. One way to ensure colocated data is to reserve particular tape cartridges for the backup sets of a particular DBMS. If the backup data size of the DBMS is fairly large compared to the capacity of the tape cartridge, this approach may be especially suitable. Thus, assuming that DBMS 110A is a relatively large database, tape cartridges #1, #2, #3, and #4 may be reserved for backup sets of DBMS 110A only. On the other hand, if the backup data size of the DBMS is relatively small compared to the capacity of each tape cartridge, then it may be preferable to consolidate backup sets from multiple DBMSs onto the same tape or set of tapes. To keep the data for each DBMS colocated, the backup sets may be grouped by DBMS into separate reserved partitions of the consolidated tape set. Thus, assuming that DBMS 110B and 110C correspond to relatively small databases with small backup data sizes, tape cartridges #5 and #6 may store backup sets for DBMS 110B and 110C, each within separate tape partitions. By writing in this colocated manner, a large number of high latency seek operations can be avoided during restores, which tend to arise when backup sets are written using simple first-in first-out (FIFO) queues or interleaved writes to tape.

Balancing Tape Resources

Next, DBMS 110C is scheduled for a full backup to start on Apr. 1, 2013 at 18:00, with an estimated backup time of 6 hours. Further, additional backup jobs are also scheduled to cover the periodic backup jobs for dates and times after Apr. 1, 2013. Since DBMS 110C is associated with a medium priority level 100, only 2 tape drives, or tape drives 152A-152B are utilized. This is illustrated in tape library 150C of FIG. 1C.

If DBMS 110B and 110C were assigned to different sets of tape cartridges, then it would be possible to schedule the backup jobs to start at the same time, since each backup job only utilizes 2 tape drives and a maximum 4 tape drives are available for backup use. However, it may be preferable to load balance the backup jobs over time as much as possible to even out the load. Accordingly, the backup jobs for DBMS 110B and 110C are queued sequentially, rather than in parallel, as shown in FIG. 1B. In this manner, more tape drives can be made available to accommodate database restore jobs or new backup jobs.

Additionally, a primary goal of many backup infrastructures is to provide rapid recovery of a failed database to minimize downtime. In this case, it would be preferable to load balance the tape drives so that more tape drives are consistently available to expedite the recovery process. For example, if a recovery of DBMS 110A is demanded on Apr. 1, 2013 at 14:00, assuming that a copy of the requested backup set is not available within working backup data 146, tape drives 152C-152F can all be utilized in parallel to quickly read the backup set from tape. Note that existing backup jobs are not affected and can continue to use the existing timeline schedule. To fine tune the distribution of tape resources between backup and restore jobs, the default priority level for restore jobs may be set to a specific level, and the number of drives reserved for restore operations may be adjusted in the tape library interfaces.

In other embodiments, the expedited completion of backup jobs may also be an important consideration. In this case, a full utilization of tape library 150 may be preferred, with backup jobs queued to utilize as many tape drives as possible. However, the high utilization level of the tape drives may render it difficult to initiate new restore jobs. Restore jobs may therefore be set with a default priority level at the maximum 0 level. In some embodiments, jobs with a higher priority or jobs with a priority level 0 may temporarily halt and defer other jobs with lower priority levels, redirecting tape drives to service the higher priority jobs. This may cause some backup jobs to be delayed in the timeline schedule. However, tape management software 134 may adjust the timeline schedule on the fly to accommodate the job delays incurred by the restore job.

Timeline Schedule Adjustment

To provide an example of such a timeline schedule adjustment, assume that a restore job is started on Apr. 3, 2013 at 23:00, using all 6 tape drives 152A-152F with an estimated completion time of 4 hours. Accordingly, the backup job for DBMS 110A scheduled on Apr. 4, 2013 at 0:00 cannot proceed, since no tape drives are free. As a result, tape management software 134 may reschedule the backup job to start on Apr. 4, 2013 at 3:00, or when the restore job is estimated to finish. Additionally, the backup job may be adjusted to use two tape drives 152A-152B instead of just a single tape drive 152A, so that the backup job can finish within the smaller time window. Further, even though the rescheduled backup job is delayed to start at 3:00, the backup job may still backup the correct state of the database, as the backup set may already be synthesized in advance as described in further detail below under "SYNTHESIZING THE ARCHIVED BACKUP DATA".

Note that for this particular backup job, while the backup set is to be written in a striped fashion to 4 tape cartridges, only 1 or 2 tape drives are scheduled to be utilized. However, since all of the data to be written is already available from synthesized backup data 148, the stripes may be written in separate passes. Thus, if 2 tape drives are utilized as with the rescheduled backup job, a first pass may write stripes #0 and #2 onto tape cartridges #1 and #3, and a second pass may write stripes #1 and #3 onto tape cartridges #2 and #4. If only 1 tape drive is utilized as with the original backup job, then four passes may write each stripe separately onto each tape cartridge. In either case, the written backup set can then be restored using up to 4 tape drives in parallel.

Thus, as discussed above, availability machine 130 creates a backup schedule to satisfy the data protection requirements of the DBMSs against various resource constraints such as limited available tape drives, limited available disk and tape media, limited network bandwidth, limited processor cycles, and other limitations. To efficiently analyze these constraints while minimizing computational overhead, techniques such as linear programming or dynamic programming may be utilized to determine a backup schedule that provides an optimal or near optimal distribution of resources to the DBMSs. Additionally, historical data, simulation data, heuristics, and other data sources and analysis techniques may be utilized to refine and optimize the backup schedule.

Synthesizing the Archived Backup Data

As previously described, each DBMS 110A-110C only sends differential incremental updates 112A-112C to availability machine 130. Further, each DBMS 110A-110C may dictate their own schedule to send these updates. Accordingly, these updates cannot be simply copied as-is to tape, but must be first organized and indexed into working backup data 146, as described above in block 202. Based on the utilization schedule determined in block 204, the required backup sets can then be synthesized as synthesized backup data 148 using working backup data 146 and index 147. These synthesized backup sets are retained within synthesized backup data 148 until they expire outside of their respective disk backup retention windows, at which point utilization schedule 136 will dictate tape backup jobs to migrate the expired synthesized backup sets to tape. Any expired data block versions may also be purged from working backup data 146 as well. In some embodiments, as previously discussed, the synthesized backup data 148 is not stored on disk storage 140 but is only created on demand.

In FIG. 1A, it may be assumed that DBMS 110A-110C have already each sent an initial full backup to availability machine 130, which is stored and indexed into working backup data 146 and index 147. If included within the updates, archive logs of change or redo records may also be merged to create updated versions of the received data blocks. After sending the initial full backup, each DBMS only sends differential incremental updates from that point forward, which are similarly stored, indexed, and merged. Accordingly, the processing and I/O overhead on production databases is minimized.

Following utilization schedule 136 as shown in FIG. 1B, the first tape backup job is a full backup of DBMS 110A. Accordingly, it may be assumed that an earlier full backup set of DBMS 110A was already scheduled and completed on disk storage 140. Since protection policy 132A was specified with a disk backup retention window of 1 month, it may be assumed that a full backup set of DBMS 110A into synthesized backup data 148 was scheduled at least 1 month prior to Apr. 1, 2013 at 0:00, or sometime on or before Mar. 1, 2013 at 0:00, and completed sometime thereafter. This backup may be scheduled as part of a backup schedule for disk storage 140, which may be prepared in a manner similar to utilization schedule 136, but with each disk-based backup job time-shifted backwards from the tape-based backup job by at least the size of the disk backup retention window for each DBMS, with the disk-based backup jobs written into synthesized backup data 148 of disk storage 140 instead of archived backup data 156 of tape library 150.

To create the synthesized full backup set of DBMS 110A on Mar. 1, 2013 at 0:00, availability machine 130 may first determine the latest consistent state of DBMS 110A as stored in disk storage 140, for example by consulting a checkpoint watermark stored within index 147. As new versions of data blocks may be added asynchronously to working backup data 146 at any time, the checkpoint watermark is used to ensure that the synthesized backup set is updated to that checkpoint watermark and no further.

Since the first scheduled backup set is a full backup, each data block for DBMS 110A is read from working backup data 146, using index 147 to select the latest version of the data block that is no later than the checkpoint watermark. If the backup set is a cumulative incremental backup or a differential incremental backup, then only the data blocks that changed since the last full backup set or the last backup set would be written, respectively. To support point-in-time snapshots for the time window between the last backup set and the present backup set, the interim versions of the data blocks and the relevant portions of index 147 may also be included as additional metadata for the backup set. Since this example is the first backup set with no "last backup set", the time window would extend to include all available versions of the data blocks.

Native Backup Format

The backup set is then written into synthesized backup data 148 using a backup format that is natively compatible with DBMS 110A. For example, if DBMS 110A is running DBMS software A, version 8, which uses a backup format that is incompatible with DBMS software A, version 10, then the backup set for DBMS 110A may be written using a backup format that is compatible with DBMS software A, version 8. Similarly, if DBMS 110B is running DBMS software A, version 10, then any backup sets for DBMS 110B may be written using a backup format that is compatible with DBMS software A, version 10. Additionally, DBMSs from different vendors may also be supported. For example, if DBMS 110C is running DBMS software B from a different vendor than DBMS software A, then any backup sets for DBMS 110C may be written using a backup format that is compatible with DBMS software B. Accordingly, a single availability machine 130 can support various different vendors and different versions of DBMSs.

Since the backup sets are written into synthesized backup data 148 using the native formats of each DBMS, the backup sets can be directly restored without the presence of availability machine 130. Thus, if availability machine 130 is down or otherwise unavailable, each DBMS can still restore backups by accessing disk storage 140 or tape library 150 directly and using the built-in backup and restore features of each respective DBMS. This may also prove to be particularly helpful when moving data to a different location that may not have access to availability machine 130. For example, when the backup set is copied to a set of tape cartridges, the administrator may simply remove the tapes and physically transport them to the new location for restoring. As previously discussed, a dedicated media pool may be created to ensure that other backup sets do not store data onto the same set of tapes.

Queuing Tape Backup Jobs

Once the backup set is available in the DBMS native format, a tape backup job can be queued according to utilization schedule 136 to distribute the backup set from synthesized backup data 148 to archived backup data 156. When the system clock of availability machine 130 reaches the scheduled start time of Apr. 1, 2013 at 0:00, the full backup set is already expired outside of the disk backup retention window and should now be migrated to tape. Accordingly, tape management software 134 may queue backup job 138A as shown in FIG. 1A, with the parameters from utilization schedule 136 including the media pool ("Free_tapes"), the number of tape drives to use (4, or tape drives 152A-152D), the priority level (10 as inherited from protection policy 132A), and the number of copies to write (1).

Accordingly, at block 206 of process 200, referring to FIG. 1A, tape management software 134 may process backup job 138A to direct tape library 150 to store the working backup data 146, prepared as a full backup set within synthesized backup data 148, as archived backup data 156 in a striped fashion onto tape cartridges #1, #2, #3, and #4, or tape cartridges 154A, 154B, 154C, and 154D using tape drives 152A-152D. Note that while only tape cartridge 154A is visible in FIG. 1A, it may be assumed that at least 6 tape cartridges are available from tape cartridges 153, including tape cartridges 154A-154F.

As discussed above, there may be situations where a tape backup job may be delayed from starting or otherwise deferred due to a higher priority job. However, since the synthesized backup data 148 may already be created according to the disk backup schedule, a delay in writing to tape will not affect the contents of the backup job. In embodiments where synthesized backup data 148 is generated on demand, the disk backup schedule may only be used as a schedule to record the checkpoint watermark of each DBMS. The backup sets corresponding to the recorded checkpoint watermarks are then synthesized on-demand when the respective tape backup jobs are queued. In this manner, even if tape backup jobs in utilization schedule 136 are deferred or delayed due to a lack of tape drive resources, the contents of the tape backup jobs are still consistent with the original disk backup schedule.

While block 206 is only discussed with respect to the first queued tape backup job entry in utilization schedule 136, block 206 may be repeated for the remainder of the scheduled tape backup jobs in utilization schedule 136. Furthermore, while process 200 is shown as a simple sequential flowchart, it should be understood that the steps in blocks 202, 204, and 206 may be carried out asynchronously in any order, and also in parallel. Additionally, while process 200 is described with respect to two storage tiers, or disk and tape, other embodiments may utilize multiple storage tiers.

A process for providing centralized tape management for databases has thus been described. By automatically generating a utilization schedule tailored to the needs of each database and the constraints of available resources, the process can optimize tape library utilization while reducing configuration and administration burdens. Further, by working at the database block level and demanding only differential incremental updates from each database with backup synthesis tasks offloaded to a centralized availability machine, data changes can be tracked in an optimal fashion while minimizing production database overhead. Additionally, various features such as replication and writing to native backup formats provide greater data accessibility and redundancy in the case of server outages. As a result, a highly optimized, reliable, and cost efficient tape backup infrastructure can be provided for databases.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
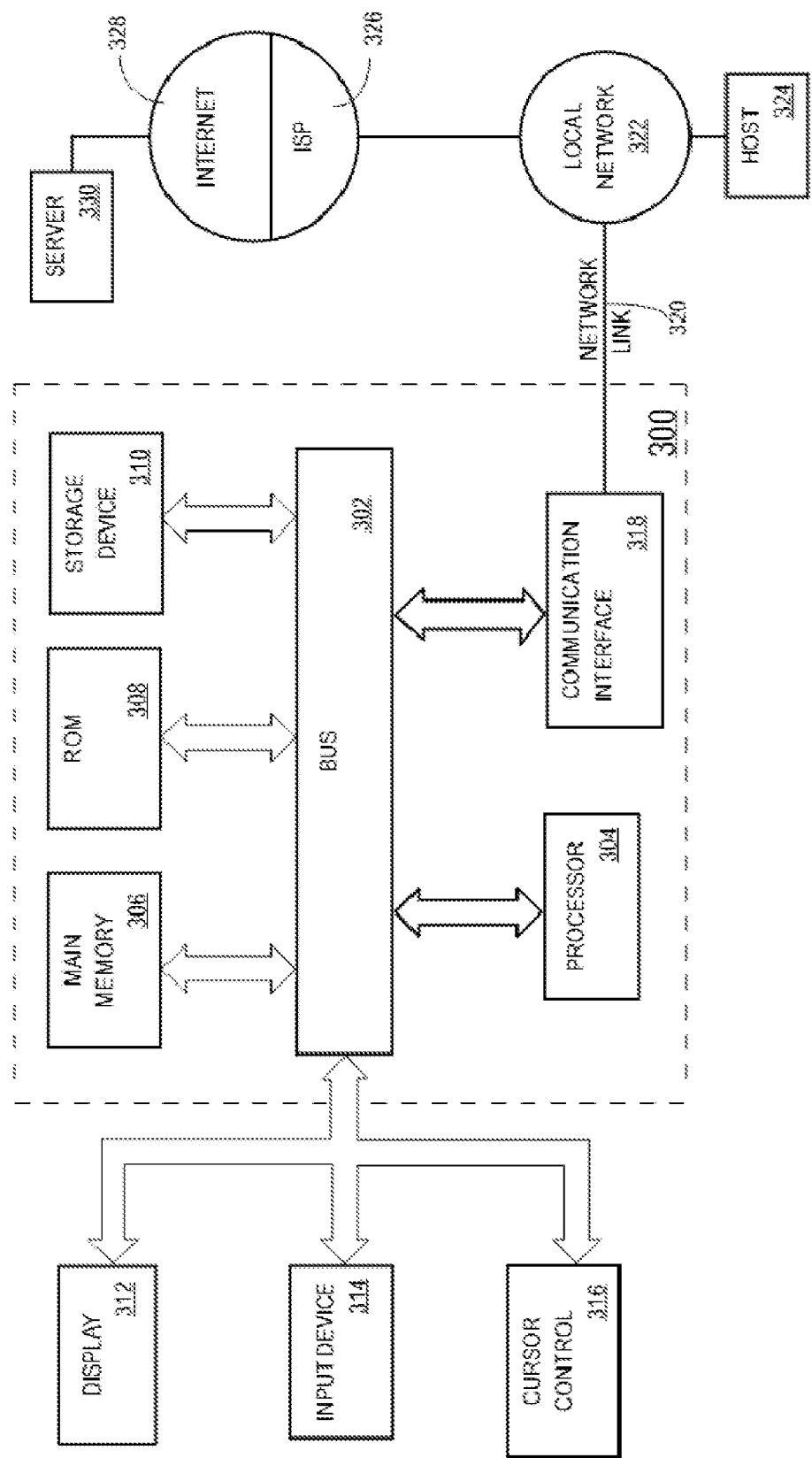
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   maintaining, at a tape backup server, working backup data for a plurality of database management systems (DBMSs) based on the tape backup server receiving, from each of the plurality of DBMSs, differential incremental updates;
   based on a plurality of protection policies, determining, at the tape backup server, a utilization schedule for distributing the working backup data to a plurality of tapes using a plurality of tape drives, wherein the utilization schedule specifies start times to archive backup data for specific DBMSs, wherein each protection policy of said plurality of protection policies:
      is stored in association with one or more DBMSs of said plurality of DBMSs, and comprises metadata that specifies one or more criteria for tape backup procedures;
   storing, using the plurality of tape drives, the working backup data as archived backup data on the plurality of tapes according to the utilization schedule;
   wherein the method is performed by one or more computing devices.

2. The method of claim 1, wherein the determining of the utilization schedule is based on load balancing the plurality of tape drives.

3. The method of claim 1, wherein each of the plurality of DBMSs is associated with one of said plurality of protection policies that indicates a priority class, and wherein the determining of the utilization schedule uses the priority class associated with each of the plurality of DBMSs.

4. The method of claim 3, wherein at least one of the plurality of protection policies specifies a tape backup retention window for retaining the archived backup data on the plurality of tapes.

5. The method of claim 1, wherein the working backup data comprises a plurality of database blocks each having one or more versions, and wherein the maintaining further maintains an index that identifies the one or more versions for each of the plurality of database blocks.

6. The method of claim 5, wherein the index identifies each of the one or more versions for each of the plurality of database blocks by a System Commit Number (SCN).

7. The method of claim 5, wherein the utilization schedule specifies a plurality of periodic tape backup jobs.

8. The method of claim 7, further comprising: prior to the storing, synthesizing, using the working backup data and the index, a backup set for a particular tape backup job of the plurality of periodic tape backup jobs, wherein the synthesized backup set is consistent with a logical time of a DBMS associated with the particular tape backup job.

9. The method of claim 8, wherein each of the plurality of DBMSs is associated with one of said plurality of protection policies, wherein at least one of the plurality of protection policies specifies a disk backup window for retaining the working backup data on disk, and wherein the logical time is a checkpoint watermark that is recorded prior to a scheduled start of the particular tape backup job by at least the disk backup window.

10. The method of claim 7, wherein the plurality of periodic tape backup jobs include any combination of full backup sets, differential incremental backup sets, and cumulative incremental backup sets.

11. The method of claim 1, wherein the determining of the utilization schedule is based on a relative backup data size of each of the plurality of DBMSs.

12. The method of claim 1, wherein the differential incremental updates are periodically polled and received from a storage location for at least one of the plurality of DBMSs.

13. The method of claim 1, wherein the differential incremental updates are received from a stream of redo records for at least one of the plurality of DBMSs.

14. The method of claim 1, wherein the archived backup data is stored in native backup formats that are directly restorable by each of the plurality of DBMSs.

15. The method of claim 1, wherein the plurality of DBMSs comprise a plurality of database versions or database vendors.

16. The method of claim 1, further comprising: determining the utilization schedule based on colocating the archived backup data by proximity for each of the plurality of DBMSs.

17. A tape backup server comprising one or more computing devices configured to:
   maintain working backup data for a plurality of database management systems (DBMSs) based on receiving, from each of the plurality of DBMSs, differential incremental updates;

based on a plurality of protection policies, determine a utilization schedule for distributing the working backup data to a plurality of tapes using a plurality of tape drives, wherein the utilization schedule specifies start times to archive backup data for specific DBMSs, wherein each protection policy of said plurality of protection policies:
   is stored in association with one or more DBMSs of said plurality of DBMSs, and comprises metadata that specifies one or more criteria for tape backup procedures;
store the working backup data as archived backup data on the plurality of tapes according to the utilization schedule.

18. The tape backup server of claim 17, wherein each of the plurality of DBMSs is associated with one of said plurality of protection policies that indicates a priority class, and wherein the determining of the utilization schedule uses the priority class associated with each of the plurality of DBMSs.

19. The tape backup server of claim 18, wherein at least one of the plurality of protection policies specifies a tape backup retention window for retaining the archived backup data on the plurality of tapes.

20. The tape backup server of claim 17, wherein the working backup data comprises a plurality of database blocks each having one or more versions, and wherein the maintaining further maintains an index that identifies the one or more versions for each of the plurality of database blocks.

21. The tape backup server of claim 20, wherein the index identifies each of the one or more versions for each of the plurality of database blocks by a System Commit Number (SCN).

22. The tape backup server of claim 20, wherein the utilization schedule specifies a plurality of periodic tape backup jobs.

23. The tape backup server of claim 22, wherein prior to the storing, the tape backup server is configured to synthesize, using the working backup data and the index, a backup set for a particular tape backup job of the plurality of periodic tape backup jobs, wherein the synthesized backup set is consistent with a logical time of a DBMS associated with the particular tape backup job.

24. The tape backup server of claim 23, wherein each of the plurality of DBMSs is associated with one of said plurality of protection policies, wherein at least one of the plurality of protection policies specifies a disk backup window for retaining the working backup data on disk, and wherein the logical time is a checkpoint watermark that is recorded prior to a scheduled start of the particular tape backup job by at least the disk backup window.

25. The tape backup server of claim 22, wherein the plurality of periodic tape backup jobs include any combination of full backup sets, differential incremental backup sets, and cumulative incremental backup sets.

26. The tape backup server of claim 17, wherein the determining of the utilization schedule is based on a relative backup data size of each of the plurality of DBMSs.

27. The tape backup server of claim 17, wherein the differential incremental updates are periodically polled and received from a storage location for at least one of the plurality of DBMSs.

28. The tape backup server of claim 17, wherein the differential incremental updates are received from a stream of redo records for at least one of the plurality of DBMSs.

29. The tape backup server of claim 17, wherein the archived backup data is stored in native backup formats that are directly restorable by each of the plurality of DBMSs.

30. The tape backup server of claim 17, wherein the plurality of DBMSs comprise a plurality of database versions or database vendors.

31. The tape backup server of claim 17, wherein the tape backup server is configured to determine the utilization schedule based on load balancing the plurality of tape drives.

32. The tape backup server of claim 17, wherein the tape backup server is configured to determine the utilization schedule based on colocating the archived backup data by proximity for each of the plurality of DBMSs.

33. A non-transitory computer-readable medium storing one or more sequences of instructions which, when executed by one or more processors, cause performing of:
   maintaining working backup data for a plurality of database management systems (DBMSs) based on receiving, from each of the plurality of DBMSs, differential incremental updates;
   based on a plurality of protection policies, determining a utilization schedule for distributing the working backup data to a plurality of tapes using a plurality of tape drives, wherein the utilization schedule specifies start times to archive backup data for specific DBMSs, wherein each protection policy of said plurality of protection policies:
      is stored in association with one or more DBMSs of said plurality of DBMSs, and comprises metadata that specifies one or more criteria for tape backup procedures;
   storing the working backup data as archived backup data on the plurality of tapes according to the utilization schedule.

34. The non-transitory computer-readable medium of claim 33, wherein the determining of the utilization schedule is based on load balancing the plurality of tape drives.

35. The non-transitory computer-readable medium of claim 33, wherein each of the plurality of DBMSs is associated with one of said plurality of protection policies that indicates a priority class, and wherein the determining of the utilization schedule uses the priority class associated with each of the plurality of DBMSs.

36. The non-transitory computer-readable medium of claim 35, wherein at least one of the plurality of protection policies specifies a tape backup retention window for retaining the archived backup data on the plurality of tapes.

37. The non-transitory computer-readable medium of claim 33, wherein the working backup data comprises a plurality of database blocks each having one or more versions, and wherein the maintaining further maintains an index that identifies the one or more versions for each of the plurality of database blocks.

38. The non-transitory computer-readable medium of claim 37, wherein the index identifies each of the one or more versions for each of the plurality of database blocks by a System Commit Number (SCN).

39. The non-transitory computer-readable medium of claim 37, wherein the utilization schedule specifies a plurality of periodic tape backup jobs.

40. The non-transitory computer-readable medium of claim 39, further comprising: prior to the storing, synthesizing, using the working backup data and the index, a backup set for a particular tape backup job of the plurality of periodic tape backup jobs, wherein the synthesized backup set is consistent with a logical time of a DBMS associated with the particular tape backup job.

41. The non-transitory computer-readable medium of claim 40, wherein each of the plurality of DBMSs is associated with one of said plurality of protection policies, wherein at least one of the plurality of protection policies specifies a disk backup window for retaining the working backup data on disk, and wherein the logical time is a checkpoint watermark that is recorded prior to a scheduled start of the particular tape backup job by at least the disk backup window.

42. The non-transitory computer-readable medium of claim 39, wherein the plurality of periodic tape backup jobs include any combination of full backup sets, differential incremental backup sets, and cumulative incremental backup sets.

43. The non-transitory computer-readable medium of claim 33, wherein the determining of the utilization schedule is based on a relative backup data size of each of the plurality of DBMSs.

44. The non-transitory computer-readable medium of claim 33, wherein the differential incremental updates are periodically polled and received from a storage location for at least one of the plurality of DBMSs.

45. The non-transitory computer-readable medium of claim 33, wherein the differential incremental updates are received from a stream of redo records for at least one of the plurality of DBMSs.

46. The non-transitory computer-readable medium of claim 33, wherein the archived backup data is stored in native backup formats that are directly restorable by each of the plurality of DBMSs.

47. The non-transitory computer-readable medium of claim 33, wherein the plurality of DBMSs comprise a plurality of database versions or database vendors.

48. The non-transitory computer-readable medium of claim 33, further comprising: determining the utilization schedule based on colocating the archived backup data by proximity for each of the plurality of DBMSs.

* * * * *

UNITED STATES PATENT AND TRADEMARK OFFICE
CERTIFICATE OF CORRECTION

| | | |
|---|---|---|
| PATENT NO. | : 9,612,912 B2 | Page 1 of 1 |
| APPLICATION NO. | : 14/202433 | |
| DATED | : April 4, 2017 | |
| INVENTOR(S) | : Wertheimer et al. | |

It is certified that error appears in the above-identified patent and that said Letters Patent is hereby corrected as shown below:

In the Specification

In Column 11, Line 49, delete "DBMC" and insert -- DBMS --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*